Dec. 8, 1936. H. GRASER 2,063,242
LOCKING MECHANISM FOR COLLAPSIBLE BABY CARRIAGES AND THE LIKE
Filed March 26, 1936
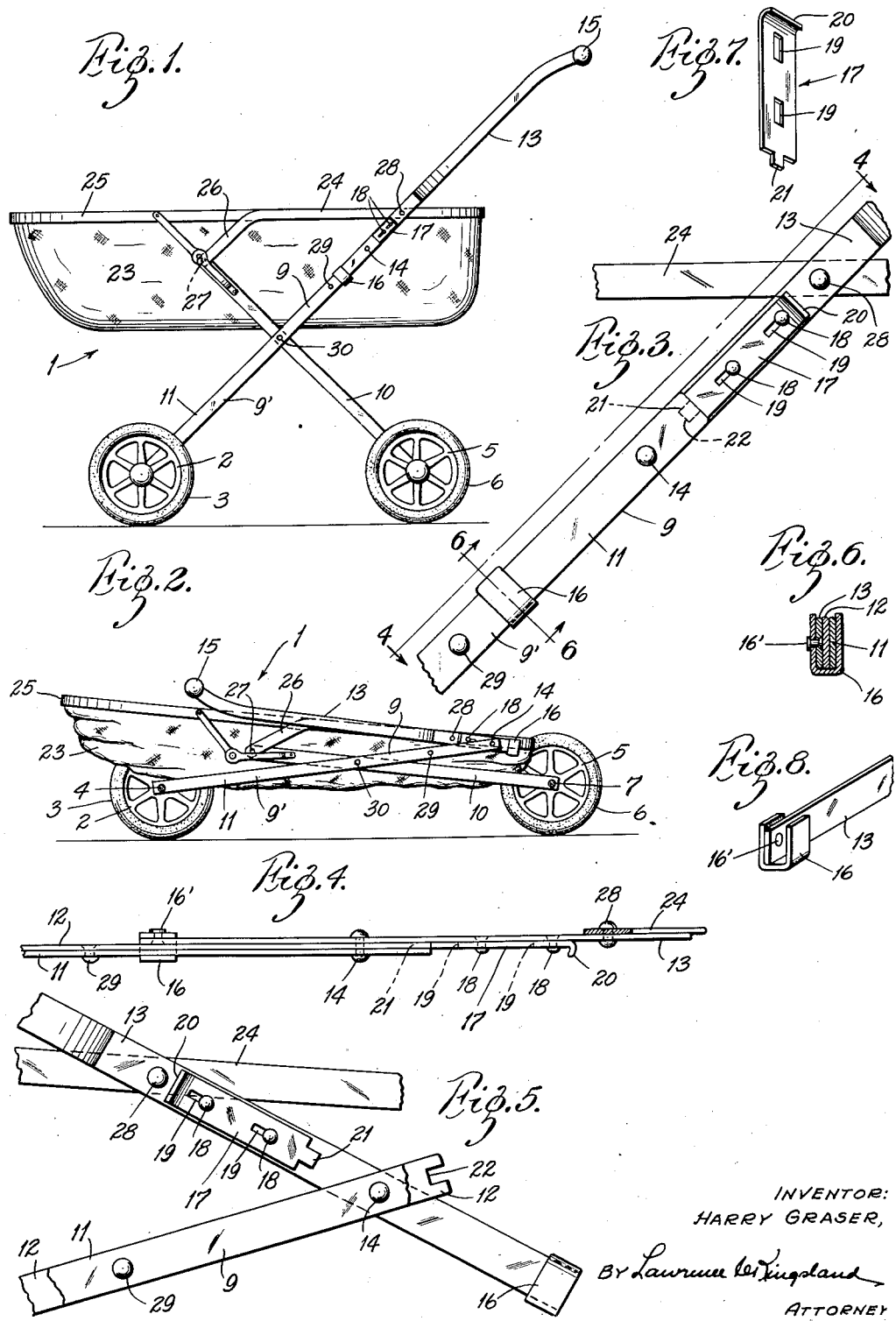
INVENTOR:
HARRY GRASER,
By Laurence C. Kingsland
ATTORNEY Patented Dec. 8, 1936

2,063,242

UNITED STATES PATENT OFFICE 2,063,242

LOCKING MECHANISM FOR COLLAPSIBLE BABY CARRIAGES AND THE LIKE

Harry Graser, St. Louis, Mo., assignor to The Perfection Manufacturing Co., St. Louis, Mo., a corporation of Missouri Application March 26, 1936, Serial No. 70,932

2 Claims. (Cl. 280—41)

The present invention relates generally to locking mechanisms, and more particularly to a locking mechanism for use with collapsible baby carriages, or the like.

In the present manufacture of collapsible baby carriages and the like, great difficulty has been experienced in providing satisfactory locking mechanism for holding the vehicles in operative position. Certain mechanisms, though positive in operation, are cumbersome, adding unnecessary weight to the carriage, and are difficult of operation. Still other mechanisms, though accessible for manipulation in adjusting the carriage from collapsed to operative position and the opposite, are unsafe in that there is not present a positive lock between the parts in the operative position. Succinctly, locking mechanisms at present employed on collapsible baby carriages and the like have proven unsatisfactory in operation.

An object of the present invention is to provide a locking mechanism which will positively hold the carriage in its operative position, so as to render the vehicle safe for the transportation of children.

A further object is to provide a locking mechanism which is easily accessible for manipulation in the collapsing and returning to operative position of the cooperating carriage construction.

Further objects are to provide a locking mechanism light in construction so as to lighten the weight of the carriage, and easy of manipulation by the most casual user of the carriage.

Further objects are to provide locking mechanisms cheap of manufacture and easy to install.

Still further objects and advantages will appear from the following description thereof, taken in connection with the accompanying drawing, in which:

Fig. 1 is a side elevation of a baby carriage in operative position showing an embodiment of the present invention installed thereon.

Fig. 2 is a side elevation of a baby carriage in collapsed position, the near wheels being removed and the axles shown in section to better illustrate the device.

Fig. 3 is an enlarged view of the locking mechanism forming the subject matter of the present invention, the elements being shown in locked position.

Fig. 4 is a section on the line 4—4 of Fig. 3.

Fig. 5 is an enlarged view of the locking mechanism showing the elements in partly collapsed position.

Fig. 6 is a section on the line 6—6 of Fig. 3.

Fig. 7 is an enlarged view, in perspective, of the sliding strap bolt.

Fig. 8 is an enlarged view, in perspective of the stop strap and associated elements.

Referring more particularly to the drawing by reference numerals, 1 indicates generally a collapsible baby carriage having an embodiment of the present invention associated therewith. The baby carriage includes front wheels 2, having tires 3, mounted on the axle 4, and rear wheels 5, having tires 6, mounted on the axle 7. A supporting structure for an infant-carrying basket includes two X-shaped frame constructions disposed one to each side of the basket. In view of the fact that the frame constructions are duplicates, only one will be described in detail. It is to be understood that normally there will be a locking mechanism at each side of the carriage.

The frame includes crossed bars 9 and 10, respectively, which are pivotally connected at 30. The bar 9 is bi-sectional in its construction, the lower section 9' including parallel adjacent strap members 11 and 12, respectively, riveted together as at 29. The two sections are pivoted at 14 near, but not at, adjacent ends so that the sections overlap somewhat when in alignment. The upper section 13 supports, at the end remote from the pivot, one end of a transverse bar 15 which serves as a handle for pushing the carriage. At the pivoted end of the section 13, fixed thereto by a rivet or other means 16', is a U-stop strap 16 which is adapted to engage the section 9' when the sections are in alignment. A flat strap-bolt 17, having spaced slots 19, is slidably connected to the section 13 just beyond the pivot point 14 by means of studs 18 which are fixed to the section 13. The bolt has a lateral flange 20 at the end remote from the pivot 14, which serves as a handle for moving the bolt along the section 13. At the end adjacent the pivot 14, the bolt has a reduced extension 21 which cooperates with a notch 22 located in the end of the strap 12. An infant-carrying basket 23, having along its top edge U-straps 24 and 25, said straps being rigidly connected to form a continuous loop, is supported by the aforesaid frame construction. The U-strap 24 has downwardly directed extensions 26 to which are pivotally connected the bars 10 at 27. An additional connection between the basket and frame construction is afforded by a pivot 28 between the section 13 and the U-strap 24. A canopy, not shown, is generally employed above the basket.

More generally considering the drawing, Figs. 1 and 2, respectively, show the two extreme positions of the collapsible carriage, the former illustrating the vehicle in operative position, and the latter as collapsed. For a better understanding of the locking mechanism per se, Fig. 3 shows the parts in locked position, whereas Fig. 5 discloses the same in unlocked position. It will be readily observed that the bolt, when in locked or operative position, due to gravity and friction between the bolt and its guide studs, will be effectively maintained in its position of cooperation with the notch in the end of the lower section of the frame bar. Further, the provision of the notch within the inner strap precludes any possibility of the bolt extension riding over the sides thereof, thereby preventing any unexpected collapsing of the carriage from such a cause while in use. The U-stop strap, of course, conveniently serves to position the sections in their locking alignment so that difficulties, which might be occasioned otherwise, in the moving home of the bolt are avoided.

From the above detailed description, it is obvious that there has been provided a simple, efficient and safe locking mechanism for use with baby carriages and the like, and that the numerous unsatisfactory details of the mechanisms at present employed have been effectively and efficiently overcome. It is to be understood that the above detailed description has been given for the purpose of illustration and example, and not for limitation, the invention being limited in scope only by the following claims:

What is claimed is:

1. A locking mechanism for collapsible baby carriages and the like comprising two bar sections pivotally connected near adjacent ends, one of said sections being of double strap construction, a notch in the end of the strap centrally located relative to the other section and strap, spaced studs fixed to the other section, a flat strap-bolt on the other section having slots therein to cooperate with the said studs to permit the bolt to slide along the said other section, a reduced projection on the bolt cooperating with the notch to hold the sections in alignment when the bolt is in locking position, and a U-stop strap fixed to the end of the said other section beyond the pivot point adapted to engage the double strap section to position the pivoted sections prior to locking.

2. A locking mechanism for baby carriages and the like comprising two pivoted bars, one of said bars including two superposed strap members, a notch in the end of the strap intermediate the other strap and the other bar, spaced headed studs on said other bar, a flat bolt having slots therein adapted to cooperate with said studs to mount said bolt on said other bar for sliding movement, said bolt having a projection adapted to cooperate with said notch, said bolt further having a right angular flange adapted to serve as a hand hold, and a U-shaped stop bracket on said other bar adapted to contact said one bar to position said bars prior to locking them in extended position.

HARRY GRASER.